United States Patent
Kong et al.

(10) Patent No.: US 12,308,438 B2
(45) Date of Patent: May 20, 2025

(54) COMPOSITE NEGATIVE ELECTRODE MATERIALS AND ELECTROCHEMICAL CELLS INCLUDING THE SAME

(71) Applicant: GM GLOBAL TECHNOLOGY OPERATIONS LLC, Detroit, MI (US)

(72) Inventors: Dewen Kong, Shanghai (CN); Qili Su, Shanghai (CN); Meiyuan Wu, Shanghai (CN); Haijing Liu, Shanghai (CN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 481 days.

(21) Appl. No.: 17/738,794

(22) Filed: May 6, 2022

(65) Prior Publication Data

US 2023/0307655 A1    Sep. 28, 2023

(30) Foreign Application Priority Data

Mar. 22, 2022   (CN) .......................... 202210285816.8

(51) Int. Cl.
*H01M 4/62* (2006.01)
*H01M 10/0525* (2010.01)
*H01M 4/02* (2006.01)

(52) U.S. Cl.
CPC ........... *H01M 4/628* (2013.01); *H01M 4/623* (2013.01); *H01M 10/0525* (2013.01); *H01M 2004/027* (2013.01)

(58) Field of Classification Search
None
See application file for complete search history.

(56) References Cited

U.S. PATENT DOCUMENTS 9,190,663 B2    11/2015   Miki
10,741,812 B2   8/2020    Luski et al.
(Continued)

FOREIGN PATENT DOCUMENTS

CN    116826042 A    9/2023
CN    117476861 A    1/2024
(Continued)

OTHER PUBLICATIONS

First Office Action for German Patent Application No. 10 2022 111 254.3 issued on Jan. 5, 2023, with correspondence from Manitz Finsterwald Patent-und Rechtsanwaltspartnerschaft mbB summarizing Office Action; 9 pages.
(Continued)

*Primary Examiner* — Ula C Ruddock
*Assistant Examiner* — Mary Grace Byram
(74) *Attorney, Agent, or Firm* — Harness, Dickey & Pierce, P.L.C.

(57) ABSTRACT

A negative electrode for an electrochemical cell that cycles lithium ions includes a particulate component embedded in a polymeric matrix component that comprises polytetrafluoroethylene. The particulate component includes a plurality of composite particles, with each of the composite particles having a core and a selective barrier layer disposed on a surface of the core. The core of each of the composite particles includes an electroactive negative electrode material. The selective barrier layer of each of the composite particles is formulated to prevent or inhibit electrochemical reactions from occurring between lithium stored in the electroactive negative electrode material of the core and the polytetrafluoroethylene in the polymeric matrix component.

20 Claims, 2 Drawing Sheets

(56) References Cited

U.S. PATENT DOCUMENTS

| | | | |
|---|---|---|---|
| 11,316,142 B2 | 4/2022 | Jiang et al. | |
| 2007/0072077 A1* | 3/2007 | Kusumoto | H01M 4/621 |
| | | | 429/223 |
| 2008/0241684 A1* | 10/2008 | Muraoka | H01M 10/0587 |
| | | | 427/58 |
| 2010/0225309 A1 | 9/2010 | Takahashi et al. | |
| 2015/0303481 A1* | 10/2015 | Duong | H01M 4/625 |
| | | | 241/5 |
| 2018/0269483 A1* | 9/2018 | Cho | H01M 4/483 |
| 2019/0115617 A1* | 4/2019 | Pan | H01M 4/04 |
| 2019/0190012 A1 | 6/2019 | Wu et al. | |
| 2021/0083264 A1 | 3/2021 | Jiang et al. | |
| 2021/0109136 A1 | 4/2021 | Hao | |
| 2021/0151761 A1 | 5/2021 | Jimenez et al. | |
| 2021/0408518 A1 | 12/2021 | Wang et al. | |
| 2022/0037642 A1 | 2/2022 | Ellison et al. | |
| 2022/0173370 A1 | 6/2022 | Kong et al. | |
| 2022/0173377 A1 | 6/2022 | Kong et al. | |
| 2022/0238885 A1 | 7/2022 | Koestner et al. | |
| 2022/0367848 A1 | 11/2022 | Kong et al. | |
| 2023/0022484 A1 | 1/2023 | Jomaa et al. | |
| 2023/0050401 A1 | 2/2023 | Ellison et al. | |
| 2023/0155108 A1 | 5/2023 | Jiang et al. | |
| 2023/0261194 A1 | 8/2023 | Ellison et al. | |
| 2024/0030552 A1 | 1/2024 | Kong et al. | |

FOREIGN PATENT DOCUMENTS

| | | |
|---|---|---|
| DE | 112012005469 T5 | 9/2014 |
| DE | 102022111254 A1 | 9/2023 |
| DE | 102022120709 A1 | 1/2024 |
| JP | 2010225309 A | 10/2010 |

OTHER PUBLICATIONS

Nicole Ellison et al.; U.S. Appl. No. 17/401,612, filed Aug. 13, 2021 titled "Cathode structure for a Battery and Method of Fabricating the Same"; 29 pages.

Meng Jiang et al.; U.S. Appl. No. 17/526,762, filed Nov. 15, 2021, titled "Methods for Making Thick Multilayer Electrodes"; 52 pages.

Nicole D. Ellison et al.; U.S. Appl. No. 17/674,235, filed Feb. 17, 2022 titled "Battery Including a Thick Cathode and a Method for Forming the Thick Cathode"; 31 pages.

Dewen Kong et al.; U.S. Appl. No. 17/945,708, filed Sep. 15, 2022, titled "Protective Layers Separating Electroactive Materials And Binder Materials In Electrode And Methods Of Forming The Same"; 52 pages.

First Office Action for German Patent Application No. 10 2022 120 709.9 issued on Jun. 20, 2023, with correspondence from Manitz Finsterwald Patent-und Rechtsanwaltspartnerschaft mbB summarizing Office Action; 5 pages.

\* cited by examiner

COMPOSITE NEGATIVE ELECTRODE MATERIALS AND ELECTROCHEMICAL CELLS INCLUDING THE SAME

CROSS-REFERENCE TO RELATED APPLICATIONS

This application claims the benefit and priority of Chinese Application No. 202210285816.8, filed Mar. 22, 2022. The entire disclosure of the above application is incorporated herein by reference.

INTRODUCTION

This section provides background information related to the present disclosure which is not necessarily prior art.

The present disclosure relates to electrodes of secondary lithium-ion batteries and, more particularly, to composite negative electrodes that include particles of an electrochemically active material embedded in a polymer binder.

Batteries generally include one or more electrochemical cells that can convert chemical energy into electrical energy by means of electrochemical reduction-oxidation (redox) reactions. In secondary or rechargeable batteries, these electrochemical reactions are reversible, which allows the batteries to undergo multiple charging and discharge cycles.

Electrochemical cells of secondary lithium batteries include a negative electrode, a positive electrode, and an electrolyte that provides a medium for the conduction of lithium ions between the negative and positive electrodes. A porous polymeric separator is oftentimes sandwiched between the negative and positive electrodes that physically separates and electrically isolates the negative and positive electrodes from each other inside the electrochemical cell. Outside the electrochemical cell, the negative and positive electrodes are electrically coupled to each other via an external circuit. The negative and positive electrodes are formulated such that an electrochemical potential is established therebetween when the electrochemical cell is at least partially charged. During discharge of the electrochemical cell, the electrochemical potential established between the negative and positive electrodes drives spontaneous redox reactions within the electrochemical cell and the release of lithium ions and electrons at the negative electrode. The lithium ions released from the negative electrode diffuse through the electrolyte to the positive electrode, while the electrons simultaneously travel from the negative electrode to the positive electrode via the external circuit, which generates an electric current. After the negative electrode has been partially or fully depleted of lithium, the electrochemical cell may be recharged by connecting the negative and positive electrodes to an external power source, which drives nonspontaneous redox reactions within the electrochemical cell and the release of the lithium ions and the electrons from the positive electrode.

In practice, electrochemical cells of secondary lithium-ion batteries are oftentimes assembled as a stack of layers, with each of the negative and positive electrodes being deposited as a thin porous layer on a metallic current collector. The negative and positive electrode layers may exhibit a composite structure, including a mixture of electrochemically active material particles embedded in a polymer binder.

SUMMARY

This section provides a general summary of the disclosure and is not a comprehensive disclosure of its full scope or all of its features.

The present disclosure relates to a negative electrode for an electrochemical cell that cycles lithium ions. The negative electrode includes a polymeric matrix component and a particulate component embedded in the polymeric matrix component. The polymeric matrix component comprises polytetrafluoroethylene. The particulate component comprises a plurality of composite particles, with each of the composite particles having a core and a selective barrier layer disposed on a surface of the core. The core of each of the composite particles comprises an electroactive negative electrode material. The selective barrier layer of each of the composite particles is formulated to prevent or inhibit electrochemical reactions from occurring between lithium stored in the electroactive negative electrode material of the core and the polytetrafluoroethylene in the polymeric matrix component.

The selective barrier layer may comprise a polymer-based material, a ceramic-based material, a nitride-based material, a halide-based material, a borate-based material, or a combination thereof.

In aspects, the selective barrier layer may comprise poly (acrylonitrile), poly(ethylene oxide), poly(ethylene glycol), polyethylene carbonate, poly(trimethylene carbonate), poly (propylene carbonate), polyvinylidene fluoride-co-hexafluoropropylene, or a combination thereof.

In aspects, the selective barrier layer may comprise a garnet-type lithium-, lanthanum-, and zirconium-containing oxide; a perovskite-type lithium-containing oxide; a lithium-containing nitride-based material; a lithium-containing halide-based material; a lithium-containing borate-based material; or a combination thereof.

For each of the composite particles, the selective barrier layer may constitute, by weight, from greater than or equal to about 0.01% to less than or equal to about 10% of the composite particle.

In aspects, the selective barrier layer may be disposed on the surface of the core in the form of a discontinuous layer that does not fully encapsulate the core.

In aspects, the selective barrier layer may be disposed on the surface of the core in the form of a continuous layer that fully encapsulates the core.

The electroactive negative electrode material in the core of each of the composite particles may comprise at least one of silicon, tin, carbon, a metal oxide, or a metal sulfide.

The polymeric matrix component may constitute, by weight, greater than or equal to about 0.5% to less than or equal to about 10% of the negative electrode.

The polymeric matrix component may comprise, by weight, greater than or equal to about 90% polytetrafluoroethylene.

The particulate component may further comprise a plurality of electrochemically inactive electrically conductive particles.

An electrochemical cell that cycles lithium ions is disclosed. The electrochemical cell comprises a positive electrode, a negative electrode physically spaced apart from the positive electrode, and a nonaqueous electrolyte that provides an ionically conductive pathway for the transport of lithium ions between the positive electrode and the negative electrode. The negative electrode comprises a polymeric matrix component and a particulate component embedded in the polymeric matrix component. The polymeric matrix component comprises polytetrafluoroethylene and the particulate component comprises a plurality of composite particles. Each of the composite particles has a core and a selective barrier layer disposed on a surface of the core. The core of each of the composite particles comprises an electroactive negative electrode material. The selective barrier layer of each of the composite particles is formulated to prevent or inhibit electrochemical reactions from occurring between lithium stored in the electroactive negative electrode material of the core and the polytetrafluoroethylene in the polymeric matrix component.

The selective barrier layer may comprise a polymer-based material, a ceramic-based material, a nitride-based material, a halide-based material, a borate-based material, or a combination thereof.

For each of the composite particles, the selective barrier layer may constitute, by weight, from greater than or equal to about 0.01% to less than or equal to about 10% of the composite particle.

In aspects, the selective barrier layer may be disposed on the surface of the core in the form of a discontinuous layer that does not fully encapsulate the core.

In aspects, the selective barrier layer may be disposed on the surface of the core in the form of a continuous layer that fully encapsulates the core.

The electroactive negative electrode material in the core of each of the composite particles may comprise at least one of silicon, tin, carbon, a metal oxide, or a metal sulfide.

For each of the composite particles, the electroactive negative electrode material may constitute, by weight, greater than or equal to about 90% of the core.

The polymeric matrix component may comprise, by weight, greater than or equal to about 90% polytetrafluoroethylene.

The polymeric matrix component may constitute, by weight, greater than or equal to about 0.5% to less than or equal to about 10% of the negative electrode.

The electrochemical cell may further comprise a porous separator disposed between the negative electrode and the positive electrode, a negative electrode current collector having a major surface, and a positive electrode current collector having a major surface. The negative electrode may be disposed on the major surface of the negative electrode current collector and the positive electrode may be disposed on the major surface of the positive electrode current collector.

The positive electrode may comprise an electrochemically active material that can undergo a reversible redox reaction with lithium at a higher electrochemical potential than the electroactive negative electrode material in the core of each of the composite particles.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
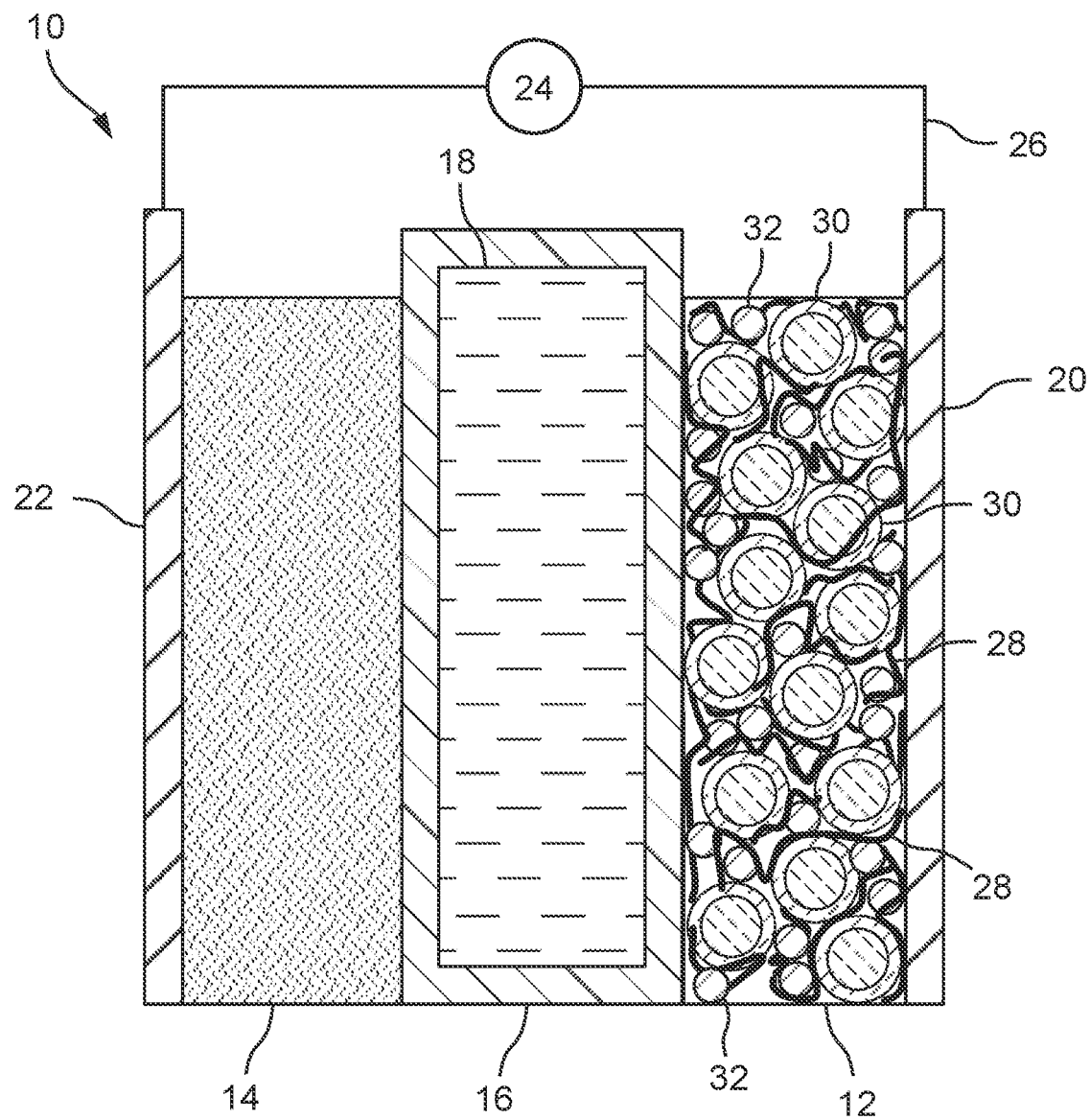
FIG. 1 is a schematic side cross-sectional view of an electrochemical cell for a secondary lithium-ion battery, wherein a negative electrode of the electrochemical cell includes a polymeric matrix component and a plurality of composite particles embedded in the polymeric matrix component, and wherein each of the composite particles has a core-shell structure defined by a core and a selective barrier layer disposed on a surface of the core.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent on a weight percentage (%) basis. This may include compositions or materials having, by weight, greater than 50% X, as well as those having, by weight, less than 50% X, so long as X is the single largest constituent of the composition or material.

Example embodiments will now be described more fully with reference to the accompanying drawings.

The present disclosure relates to negative electrodes of secondary lithium-ion batteries that exhibit a composite structure including a particulate component embedded in and dispersed throughout a polymeric matrix component. The polymeric matrix component comprises a polytetrafluoroethylene binder. The particulate component comprises a plurality of composite particles having a core-shell structure defined by a core and a selective barrier layer disposed on a surface of the core. The core of each of the composite particles comprises an electroactive negative electrode material. The selective barrier layer extends around the core of each of the composite particles and is formulated to prevent or inhibit electrochemical reactions from occurring between lithium stored in the electroactive negative electrode material of the core and the polytetrafluoroethylene binder in the polymeric matrix component. The selective barrier layer may help prevent the loss of active lithium during battery cycling, which might otherwise occur due to parasitic reactions between lithium stored in the core of the composite particles and the polytetrafluoroethylene binder in the surrounding polymeric matrix component.

FIG. 1 depicts an electrochemical cell 10 that may be included in a battery that cycles lithium ions, such as a secondary lithium-ion battery. The electrochemical cell 10 includes a negative electrode 12, a positive electrode 14, a porous separator 16 disposed between the negative and positive electrodes 12, 14, and an ionically conductive electrolyte 18 infiltrating the negative electrode 12, the positive electrode 14, and the porous separator 16. The negative electrode 12 is disposed on a major surface of a negative electrode current collector 20 and the positive electrode 14 is disposed on a major surface of a positive electrode current collector 22. In practice, the negative and positive electrode current collectors 20, 22 may be electrically coupled to a load or an external power source 24 via an external circuit 26.

The electrochemical cell 10 may be used in secondary lithium-ion batteries for vehicle or automotive transportation applications (e.g., motorcycles, boats, tractors, buses, motorcycles, mobile homes, campers, and tanks), as well as in a wide variety of other industries and applications, including aerospace components, consumer products, devices, buildings (e.g., houses, offices, sheds, and warehouses), office equipment and furniture, and industrial equipment machinery, agricultural or farm equipment, or heavy machinery, by way of non-limiting example. In certain aspects, the electrochemical cell 10 may be used in secondary lithium-ion batteries for Hybrid Electric Vehicles (HEVs) and/or Electric Vehicles (EVs).

The negative and positive electrodes 12, 14 are formulated such that, when the electrochemical cell 10 is at least partially charged, an electrochemical potential difference is established between the negative and positive electrodes 12, 14. During discharge of the electrochemical cell 10, the electrochemical potential established between the negative and positive electrodes 12, 14 drives spontaneous redox reactions within the electrochemical cell 10 and the release of lithium ions and electrons at the negative electrode 12. The released lithium ions travel from the negative electrode 12 to the positive electrode 14 through the porous separator 16 and the ionically conductive electrolyte 18, and the electrons travel from the negative electrode 12 to the positive electrode 14 via the external circuit 26, which generates an electric current. After the negative electrode 12 has been partially or fully depleted of lithium, the electrochemical cell 10 may be recharged by connecting the negative and positive electrodes 12, 14 to the external power source 24, which drives nonspontaneous redox reactions within the electrochemical cell 10 and the release of the lithium ions and the electrons from the positive electrode 14. The repeated charging and discharge of the electrochemical cell 10 may be referred to herein as "cycling," with a full charge event followed by a full discharge event being considered a full cycle.

The negative electrode 12 may be in the form of a continuous porous layer of material deposited on a major surface of the negative electrode current collector 20. The negative electrode 12 is configured to store and release lithium ions to facilitate charging and discharge, respectively, of the electrochemical cell 10. The negative electrode 12 may have a thickness, defined between the major surface of the negative electrode current collector 20 and the separator 16 of greater than or equal to about 20 micrometers to less than or equal to about 100 micrometers.

The negative electrode 12 is a composite material and includes a polymeric matrix component 28 and a particulate component embedded in the polymeric matrix component 28. The particulate component includes composite particles 30 and optionally electrically conductive particles 32 distributed throughout the polymeric matrix component 28.

The polymeric matrix component 28 is formulated to provide the negative electrode 12 with structural integrity, for example, by creating cohesion between the composite particles 30 and the optional electrically conductive particles 32. The polymeric matrix component 28 comprises polytetrafluoroethylene (PTFE). The polymeric matrix component 28 may comprise, by weight, greater than about 50%, greater than about 75%, or greater than about 90% polytetrafluoroethylene. In aspects, the polymeric matrix component 28 may consist essentially of or consist entirely of polytetrafluoroethylene. The polymeric matrix component 28 may account for, by weight, greater than or equal to about 0.5% to less than or equal to about 10% of the negative electrode 12, greater than or equal to about 0.5% to less than or equal to about 5% of the negative electrode 12, or greater than or equal to about 0.5% to less than or equal to about 2.5% of the negative electrode 12. In aspects, the polymeric matrix component 28 may account for, by weight, about 1% of the negative electrode 12.

Figure 2:
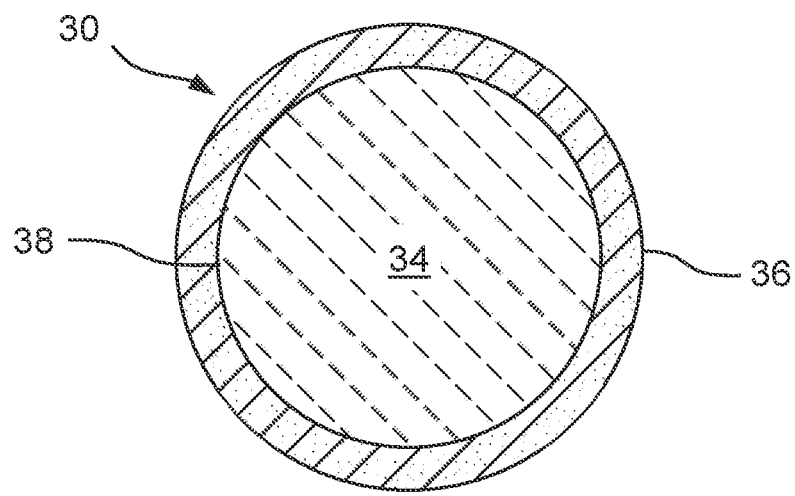
FIG. 2 is a schematic cross-sectional view of one of the composite particles of FIG. 1 depicting the core and the selective barrier layer, wherein the selective barrier layer is in the form of a substantially continuous layer that completely encapsulates the core.

As best shown in FIG. 2, each of the composite particles 30 has a core-shell structure defined by a core 34 and a selective barrier layer 36 disposed on a surface 38 of the core 34.

The core 34 of each of the composite particles 30 is formulated to store and release lithium ions during charging and discharge, respectively, of the electrochemical cell 10. To accomplish this, the core 34 of each of the composite particles 30 in the negative electrode 12 includes one or more electrochemically active (electroactive) materials that can facilitate the storage and release of lithium ions in the negative electrode 12 by undergoing a reversible redox reaction with lithium during charging and discharge of the electrochemical cell 10. For example, the core 34 of each of the composite particles 30 may comprise a lithium intercalation host material, a material that can reversibly alloy with lithium (a lithium alloying material), and/or a conversion material that can reversibly react with lithium by undergoing a phase change or a change in crystalline structure accompanied by a change in oxidation state during charging and discharge of the electrochemical cell 10. Examples of lithium intercalation host materials, lithium alloying materials, and conversion materials for the core 34 include: carbon-based materials (e.g., graphite, graphene, and/or carbon nanotubes), silicon-based materials (e.g., silicon (Si) and/or Si alloys), tin-based materials (e.g., tin (Sn) and/or Sn alloys), metal oxides (e.g., $V_2O_5$ and/or $Co_3O_4$), and/or metal sulfides (e.g., FeS). In aspects, the electroactive material may constitute, by weight, greater than or equal to about 90%, greater than or equal to about 95%, or greater than or equal to about 99% of the core 34.

The core 34 of each of the composite particles 30 may have a diameter in a range of from greater than or equal to about one micrometer to less than or equal to about 40 micrometers.

Without intending to be bound by theory, it is believed that, during cycling of the electrochemical cell 10, parasitic side reactions may occur between the polytetrafluoroethylene in the polymeric matrix component 28 and the lithium stored in the electrochemically active material of the cores 34 of the composite particles 30. It is believed that such parasitic side reactions may consume active lithium and thereby reduce the overall capacity of the electrochemical cell 10.

The selective barrier layer 36 is formulated and arranged on the surface 38 of the core 34 in a manner which effectively prevents or inhibits electrochemical reactions from occurring between lithium stored in the electroactive material of the core 34 and the polytetrafluoroethylene in the polymeric matrix component 28. At the same time, the selective barrier layer 36 is ionically conductive and allows lithium ions to pass therethrough during charging and discharge of the electrochemical cell 10. The selective barrier layer 36 may comprise an ionically conductive material that can chemically and/or physically isolate lithium stored in the core 34 of the composite particles 30 from the polytetrafluoroethylene in the surrounding polymeric matrix component 28. In aspects, the selective barrier layer 36 may comprise a polymer-based material, a ceramic-based material, a nitride-based material, a halide-based material, a borate-based material, or a combination thereof. Examples of polymer-based materials include poly(acrylonitrile) (PAN), poly(ethylene oxide) (PEO), poly(ethylene glycol) (PEG), polyethylene carbonate (PEC), poly(trimethylene carbonate) (PTMC), poly(propylene carbonate) (PPC), polyvinylidene fluoride-co-hexafluoropropylene (PVdF-HFP), and combinations thereof. Examples of ceramic-based materials include garnet-type lithium-, lanthanum-, and zirconium-containing oxides, perovskite-type lithium-containing oxides, and combinations thereof. Examples of garnet-type lithium-, lanthanum-, and zirconium-containing oxides include $Li_7La_3Zr_2O_{12}$ (LLZO), $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Ca_{0.1}Zr_{1.75}Nb_{0.25}O_{12}$, and combinations thereof. Examples of perovskite-type lithium-containing oxides include $Li_{3.3}La_{0.53}TiO_3$, $LiSr_{1.65}Zr_{1.3}Ta_{1.7}O_9$, $Li_{2x-y}$ $Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof. Examples of lithium-containing nitride-based materials include $Li_3N$, $Li_7PN_4$, $LiSi_2N_3$, and combinations thereof. Examples of lithium-containing halide-based materials include LiI, $Li_3InCl_6$, $Li_2CdCl_4$, $Li_2MgCl_4$, $LiCdI_4$, $Li_2ZnI_4$, $Li_3OCl$, $Li_3YCl_6$, $Li_3YBr_6$, and combinations thereof. Examples of lithium-containing borate-based materials include $Li_2B_4O_7$, $Li_2O-B_2O_3-P_2O_5$, and combinations thereof.

In FIG. 2, the selective barrier layer 36 is disposed on the surface 38 of the core 34 in the form of a substantially continuous layer of material that completely encapsulates the core 34.

Figure 3:
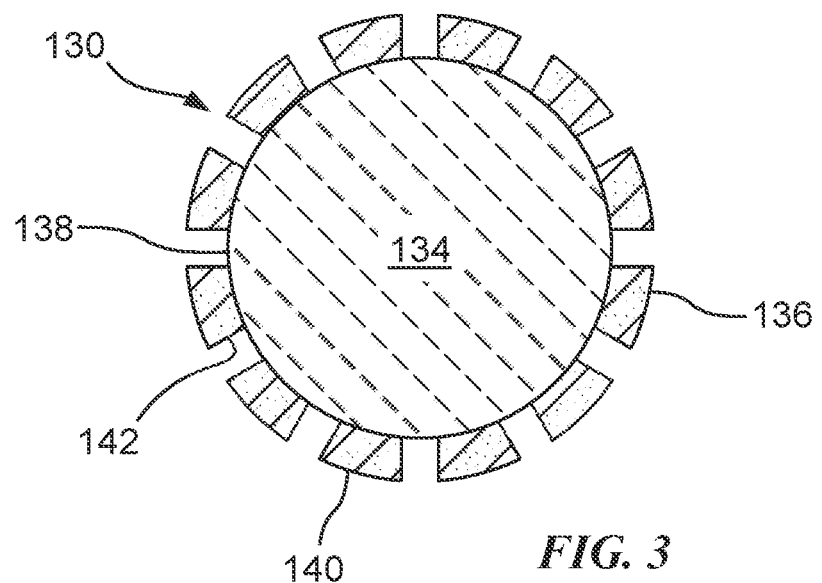
FIG. 3 is a schematic cross-sectional view of another composite particle having a core-shell structure defined by a core and a selective barrier layer disposed on a surface of the core, wherein the selective barrier layer is in the form of a discontinuous layer that extends over and surrounds the core but does not completely encapsulate the core.

Referring now to FIG. 3, in aspects, the negative electrode 12 may include composite particles 130 having a core-shell structure defined by a core 134 and a selective barrier layer 136 disposed on a surface 138 of the core 134. The composite particles 130 are similar in many respects to the composite particles 30 discussed above with respect to FIGS. 1 and 2 and description of common subject matter may not be repeated here. In FIG. 3, the selective barrier layer 136 is disposed on the surface 138 of the core 134 in the form of a discontinuous layer that extends over the surface 138 and surrounds the core 134 but does not completely encapsulate the core 134. As shown in FIG. 3, in aspects, the selective barrier layer 136 may be defined by a plurality of lands 140 and a plurality of apertures 142. The lands 140 may be physically spaced apart and isolated from one another by the apertures 142, or the lands 140 may define an interconnected network surrounding the core 134. The apertures 142 may be sized to selectively exclude the polytetrafluoroethylene in the surrounding polymeric matrix component 28, while allowing lithium ions to pass therethrough.

The selective barrier layer 36, 136 may have has a thickness of greater than or equal to about 1 nanometer to less than or equal to about 100 nanometers.

In each of the composite particles 30, 130, the core 34, 134 may constitute, by weight, greater than or equal to about 90% to less than or equal to about 99.99% of the composite particle 30, 130. In aspects, the core 34, 134 may constitute, by weight, greater than or equal to about 99% to less than or equal to about 99.95% of the composite particle 30, 130. The selective barrier layer 36, 136 may constitute, by weight, greater than or equal to about 0.01% to less than or equal to about 10% of the composite particle 30, 130. In aspects, the selective barrier layer 36, 136 may constitute, by weight, from greater than or equal to about 0.05% to less than or equal to about 2.0% of the composite particle 30, 130. For example, in aspects, the selective barrier layer 36, 136 may constitute, by weight, about 1.3% of the composite particle 30, 130.

The optional electrically conductive particles 32 are formulated to provide the negative electrode 12 with high electrical conductivity, for example, by forming a robust electrically conductive network throughout the negative electrode 12. The electrically conductive particles 32 are electrochemically inactive and do not reversibly react with lithium during charging and discharge of the electrochemical cell 10. The electrically conductive particles 32 may comprise particles of a carbon-based material, metal particles, and/or an electrically conductive polymer. Examples of electrically conductive carbon-based materials include carbon black (e.g., acetylene black), graphite, graphene (e.g., graphene nanoplatelets), carbon nanotubes (e.g., single-walled carbon nanotubes), and/or carbon fibers (e.g., carbon nanofibers). Examples of electrically conductive metal particles include powdered copper, nickel, aluminum, silver, and/or alloys thereof. Examples of electrically conductive polymers include polyaniline, polythiophene, polyacetylene, and/or polypyrrole. The optional electrically conductive particles 32 may have a mean particle diameter of greater than or equal to about 2 nanometers to less than or equal to about 20 micrometers and may account for, by weight, greater than 0% to less than or equal to about 10% of the negative electrode 12. For example, the electrically conductive particles 32 may account for, by weight, greater than or equal to about 0.5% to less than or equal to about 5% of the negative electrode 12. In aspects, the electrically conductive particles 32 may account for, by weight, about 2% of the negative electrode 12.

The positive electrode 14 may be in the form of a continuous porous layer of material and may include one or more electrochemically active materials that can undergo a reversible redox reaction with lithium at a higher electrochemical potential than the electrochemically active material of the negative electrode 12 such that an electrochemical potential difference exists between the negative and positive electrodes 12, 14. For example, the positive electrode 14 may comprise a lithium intercalation host material that can undergo the reversible insertion or intercalation of lithium ions, a material that can reversibly alloy with lithium (a lithium alloying material), and/or a conversion material that can reversibly react with lithium by undergoing a phase change or a change in crystalline structure accompanied by a change in oxidation state during charging and discharge of the electrochemical cell 10. Examples of lithium intercalation host materials for the positive electrode 14 include layered oxides represented by the formula $LiMeO_2$, olivine-type oxides represented by the formula $LiMePO_4$, spinel-type oxides represented by the formula $LiMe_2O_4$, tavorites represented by one or both of the following formulas $LiMeSO_4F$ or $LiMePO_4F$, and combinations thereof, where Me is a transition metal (e.g., Co, Ni, Mn, Fe, Al, V, or a combination thereof). Examples of conversion materials for the positive electrode 14 include sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, a lithium and/or metal compound of any of the foregoing, and combinations thereof. Examples of metals for inclusion in the conversion material of the positive electrode 14 include iron, manganese, nickel, copper, and cobalt.

The electrochemically active material of the positive electrode 14 may be a particulate material and particles of the electrochemically active material of the positive electrode 14 may be intermingled with a polymer binder to provide the positive electrode 14 with structural integrity. Examples of polymer binders include polyvinylidene fluoride (PVdF), polytetrafluoroethylene (PTFE), ethylene propylene diene monomer (EPDM) rubber, styrene butadiene rubber (SBR), carboxymethyl cellulose (CMC), nitrile butadiene rubber (NBR), styrene-butadiene rubber (SBR), polyacrylates, alginates, polyacrylic acid, and mixtures thereof. The positive electrode 14 optionally may include particles of an electrochemically inactive electrically conductive material. Examples of electrically conductive materials include particles of a carbon-based material, metal particles, and/or an electrically conductive polymer. Examples of electrically conductive carbon-based materials include carbon black (e.g., acetylene black), graphite, graphene (e.g., graphene nanoplatelets), carbon nanotubes (e.g., single-walled carbon nanotubes), and/or carbon fibers (e.g., carbon nanofibers).

Examples of electrically conductive metal particles include powdered copper, nickel, aluminum, silver, and/or alloys thereof. Examples of electrically conductive polymers include polyaniline, polythiophene, polyacetylene, and/or polypyrrole The porous separator 16 electrically isolates the negative and positive electrodes 12, 14 from each other and may be in the form of a microporous ionically conductive and electrically insulating film or non-woven material, e.g., a manufactured sheet, web, or matt of directionally or randomly oriented fibers. In aspects, the porous separator 16 may comprise a microporous polymeric material, e.g., a microporous polyolefin-based membrane or film. For example, the porous separator 16 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In certain aspects, the porous separator 16 may comprise a laminate of one or more polymeric materials, such as a laminate of PE and PP.

The electrolyte 18 provides a medium for the conduction of lithium ions through the electrochemical cell 10 between the negative and positive electrodes 12, 14 and may be in the form of a liquid, solid, or gel. In aspects, the electrolyte 18 may comprise a nonaqueous liquid electrolyte solution including one or more lithium salts dissolved in a nonaqueous aprotic organic solvent or a mixture of nonaqueous aprotic organic solvents. Examples of lithium salts include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. Examples of nonaqueous aprotic organic solvents include alkyl carbonates, for example, cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof. In aspects where the electrolyte 18 is in the form of a solid, the electrolyte 18 may function as both an electrolyte and a separator and may eliminate the need for a discreate separator 16.

The negative and positive electrode current collectors 20, 22 are electrically conductive and provide an electrical connection between the external circuit 26 and their respective negative and positive electrodes 12, 14. In aspects, the negative and positive electrode current collectors 20, 22 may be in the form of nonporous metal foils, perforated metal foils, porous metal meshes, or a combination thereof. The negative electrode current collector 20 may be made of copper, nickel, or alloys thereof, stainless steel, or other appropriate electrically conductive material. The positive electrode current collector 22 may be made of aluminum (Al) or another appropriate electrically conductive material.

The composite particles 30, 130 may be manufactured by depositing the selective barrier layer 36, 136 on the surface 38, 138 of the core 34, 134 using a wet or dry deposition process. For example, the selective barrier layer 36, 136 may be deposited on the surface 38, 138 of the core 34, 134 by forming a slurry including a mixture of the selective barrier layer material dissolved or dispersed in a solvent, depositing the slurry on the surface 38, 138 of the core 34, 134, and then removing the solvent. As another example, the selective barrier layer 36, 136 may be deposited on the surface 38, 138 of the core 34, 134 using a fusion coating process.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A negative electrode for an electrochemical cell that cycles lithium ions, the negative electrode comprising:
   a polymeric matrix component comprising polytetrafluoroethylene; and
   a particulate component embedded in the polymeric matrix component, the particulate component comprising a plurality of composite particles, with each of the composite particles having a core and a selective barrier layer disposed on a surface of the core in the form of a discontinuous layer that does not fully encapsulate the core,
   the core of each of the composite particles comprising, by weight, greater than or equal to 90% graphite and constituting, by weight, greater than or equal to 90% and less than or equal to 99.99% of the composite particle, and
   the selective barrier layer comprising at least one aperture sized to selectively exclude the polytetrafluoroethylene in the polymeric matrix, while allowing lithium ions to pass therethrough.

2. The negative electrode of claim 1, wherein the selective barrier layer comprises a polymer-based material, a ceramic-based material, a nitride-based material, a halide-based material, a borate-based material, or a combination thereof.

3. The negative electrode of claim 1, wherein the selective barrier layer comprises poly(acrylonitrile), poly(ethylene oxide), poly(ethylene glycol), polyethylene carbonate, poly (trimethylene carbonate), poly(propylene carbonate), polyvinylidene fluoride-co-hexafluoropropylene, or a combination thereof.

4. The negative electrode of claim 1, wherein the selective barrier layer comprises a garnet-type lithium-, lanthanum-, and zirconium-containing oxide; a perovskite-type lithium-containing oxide; a lithium-containing nitride-based material; a lithium-containing halide-based material; a lithium-containing borate-based material; or a combination thereof.

5. The negative electrode of claim 1, wherein, for each of the composite particles, the selective barrier layer constitutes, by weight, from greater than or equal to about 0.01% to less than or equal to about 10% of the composite particle.

6. The negative electrode of claim 1, wherein the polymeric matrix component constitutes, by weight, greater than or equal to about 0.5% to less than or equal to about 10% of the negative electrode.

7. The negative electrode of claim 1, wherein the polymeric matrix component comprises, by weight, greater than or equal to about 90% polytetrafluoroethylene.

8. The negative electrode of claim 1, wherein the particulate component further comprises a plurality of electrochemically inactive electrically conductive particles.

9. An electrochemical cell that cycles lithium ions, the electrochemical cell comprising:
 a positive electrode;
 a negative electrode physically spaced apart from the positive electrode; and
 a nonaqueous electrolyte that provides an ionically conductive pathway for the transport of lithium ions between the positive electrode and the negative electrode,
 wherein the negative electrode comprises a polymeric matrix component and a particulate component embedded in the polymeric matrix component, the polymeric matrix component comprising polytetrafluoroethylene and the particulate component comprising a plurality of composite particles, with each of the composite particles having a core and a selective barrier layer disposed on a surface of the core in the form of a discontinuous layer that does not fully encapsulate the core,
 the core of each of the composite particles comprising, by weight, greater than or equal to 90% graphite and constituting, by weight, greater than or equal to 90% and less than or equal to 99.99% of the composite particle, and
 the selective barrier layer comprising at least one aperture sized to selectively exclude the polytetrafluoroethylene in the polymeric matrix, while allowing lithium ions to pass therethrough.

10. The electrochemical cell of claim 9, wherein the selective barrier layer comprises a polymer-based material, a ceramic-based material, a nitride-based material, a halide-based material, a borate-based material, or a combination thereof.

11. The electrochemical cell of claim 10, wherein, for each of the composite particles, the selective barrier layer constitutes, by weight, from greater than or equal to about 0.01% to less than or equal to about 10% of the composite particle.

12. The negative electrode of claim 9, wherein the polymeric matrix component comprises, by weight, greater than or equal to about 90% polytetrafluoroethylene, and wherein the polymeric matrix component constitutes, by weight, greater than or equal to about 0.5% to less than or equal to about 10% of the negative electrode.

13. The electrochemical cell of claim 9, further comprising:
 a porous separator disposed between the negative electrode and the positive electrode;
 a negative electrode current collector having a major surface; and
 a positive electrode current collector having a major surface,
 wherein the negative electrode is disposed on the major surface of the negative electrode current collector and the positive electrode is disposed on the major surface of the positive electrode current collector.

14. The negative electrode of claim 1, wherein the selective barrier layer of each of the composite particles is formulated to prevent or inhibit electrochemical reactions from occurring between lithium stored in the core and the polytetrafluoroethylene in the polymeric matrix component.

15. The negative electrode of claim 1, wherein the selective barrier layer comprises polyethylene carbonate, poly(trimethylene carbonate), poly(propylene carbonate), or a combination thereof.

16. The negative electrode of claim 1, wherein the selective barrier layer comprises a perovskite-type lithium-containing oxide selected from the group consisting of $Li_{3.3}La_{0.53}TiO_3$; $LiSr_{1.65}Zr_{1.3}Ta_{1.7}O_9$; $Li_{2x-y}Sr_{1-x}Ta_yZr_{1-y}O_3$, where x=0.75y and 0.60<y<0.75; $Li_{3/8}Sr_{7/16}Nb_{3/4}Zr_{1/4}O_3$; and $Li_{3x}La_{(2/3-x)}TiO_3$, where 0<x<0.25.

17. The negative electrode of claim 1, wherein the selective barrier layer comprises a lithium-containing halide-based material selected from the group consisting of LiI, $Li_3InCl_6$, $Li_2CdCl_4$, $Li_2MgCl_4$, $LiCdI_4$, $Li_2ZnI_4$, $Li_3OCl$, $Li_3YCl_6$, and $Li_3YBr_6$.

18. The negative electrode of claim 1, wherein the selective barrier layer has a thickness of greater than or equal to 1 nanometer to less than or equal to 100 nanometers.

19. The negative electrode of claim 18, wherein, for each of the composite particles, the selective barrier layer constitutes, by weight, greater than or equal to 0.05% and less than or equal to 2% of the composite particle and the core constitutes, by weight, greater than or equal to 98% and less than or equal to 99.95% of the composite particle.

20. The negative electrode of claim 18, wherein the core of each of the composite particles has a diameter of greater than or equal to 1 micrometer and less than or equal to 40 micrometers.

* * * * *